United States Patent [19]
De Visscher

[11] 3,777,771
[45] Dec. 11, 1973

[54] JOINING OF CONTAINERS
[76] Inventor: Patrick M. De Visscher, rue du Bois Imperial 16, Maransart, Belgium
[22] Filed: May 22, 1972
[21] Appl. No.: 255,465

[30] Foreign Application Priority Data
May 27, 1971 Belgium .............................. 103,926
Apr. 28, 1972 Belgium .............................. 116,984

[52] U.S. Cl................... 137/1, 137/614, 251/149.6, 137/614.04
[51] Int. Cl........................... F17d 1/00, F16l 35/00
[58] Field of Search.................. 137/614.02, 614.03, 137/614.04, 1–15, 614, 614.01, 614.05, 614.06, 63 R; 251/149, 149.1, 149.6, 149.9

[56] References Cited
UNITED STATES PATENTS
3,570,808  3/1971  Wrenn ............................. 251/149.6
2,485,006  10/1949  Main, Jr. et al. ............... 137/614.03
2,456,045  12/1948  Brock ............................. 137/614.03
2,498,104  2/1950  Brandau et al. ............... 137/614.03
2,254,997  9/1941  Fisher ............................. 137/614.03
2,505,093  4/1950  Brock ....................... 137/614.03 X Primary Examiner—Samuel Scott
Assistant Examiner—Ira S. Lazarus
Attorney—Eric H. Waters et al.

[57] ABSTRACT

A process for joining together connecting parts of at least two containers which contain fluids at identical or different pressures, in an ambient fluid with a pressure that is lower than that of at least one of the containers, while preventing the ambient fluid to be introduced into one container, comprising the steps of first liberating the fluid of the container with a pressure higher than that of the ambient fluid, while effecting coupling of the connecting parts, and subsequently driving out the ambient fluid from the empty spaces between the connecting parts.

1 Claim, 3 Drawing Figures

JOINING OF CONTAINERS

The joining, in an ambient fluid, of two containers containing fluids at identical or different pressures has always posed a problem. One of the difficulties consists in particular in completely eliminating the ambient fluid which tends to occupy the empty spaces which may exist between the parts of the junction.

This problem confronts in particular persons engaging in submarine diving, for whom it would be easier, when the supply of compressed air has been exhausted, to connect themselves to a new cylinder while remaining under the water without having to return to the surface.

The present invention relates to a process for effecting the joining of at least two containers which contain fluids at identical or different pressures, in an ambient fluid the pressure of which is lower than the pressure of at least one of the containers, while making it impossible for the ambient fluid to be introduced into one of the containers. For this purpose, during the coupling of the parts of the junction, the fluid of the container with a pressure higher than that of the ambient fluid is first liberated so as to drive out the ambient fluid from any empty spaces which may exist between the parts of the junction.

The accompanying drawings illustrate by way of example one exemplary embodiment for practicing the invention, applied to a junction intended for connection under an ambient fluid, e.g. water, of a source of respiratory gas, such as a container of compressed air or other gas, to a pipe ending in a breathing mouthpiece for a submarine diver, without it being possible for water to penetrate into said pipe while an exhausted container is being replaced by a charged container.

In the drawings, constituting axial sections of a junction,

Figure 1:
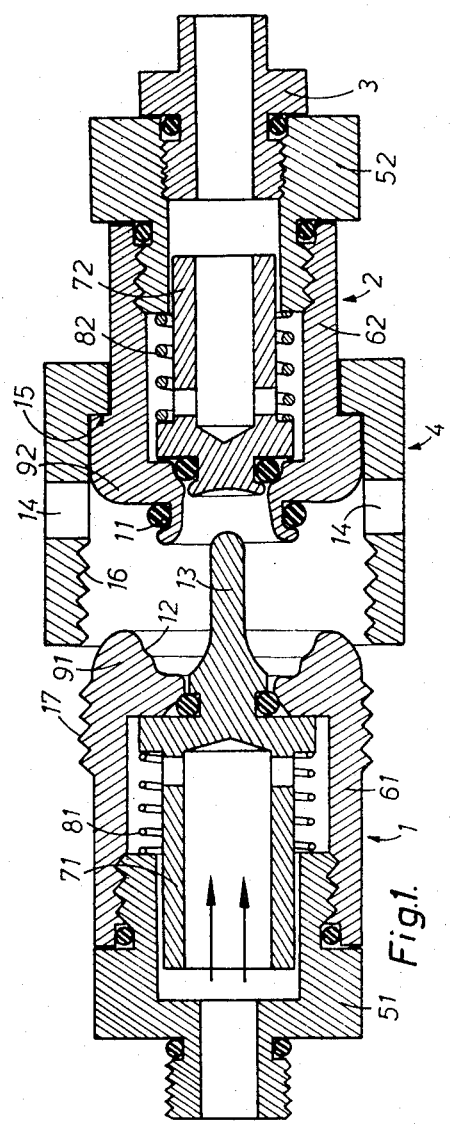
FIG. 1 shows the two connecting parts in the uncoupled condition.

The exemplary junction for practicing the inventive process comprises substantially a first connecting part 1 mounted on a compressed gas container (not illustrated), a second connecting part 2 fastened to a pipe 3 which may be provided with a mouthpiece, and also means for coupling these two parts together, such as a sleeve 4.

Each connecting part 1 and 2 is constituted by a bottom portion 51, 52 and a top portion 61, 62, these portions enclosing between them a cylindrical portion containing a piston 71, 72 adapted to move between the bottom portion and the top portion and to be pushed towards the latter by a spring 81, 82. The spring 82 has greater resistance to compression than the spring 81.

Front portions 91 and 92 of the top portions 61, 62 are intended to cooperate during the joining of the connection parts 1 and 2 and are provided internally with a conical portion serving as a stop for a sealing ring 10 received in a groove provided on the piston 71, 72.

On the outside the front portions 91 and 92 are shaped differently so as to be able to engage one in the other on the coupling of the parts 1 and 2, and one of these portions, in this specific case the portion 92, is provided with a groove in which is held a sealing ring 11 which, when the parts 1 and 2 are coupled together (FIGS. 2 and 3), is pressed against a conical face 12 on the portion 91.

Between the fronts of the piston 71 and 72 is disposed a longitudinal pin 13 which is fastened to one of the pistons and adapted to come into contact with the other piston.

The sleeve 4 is provided with ports 14 in its cylindrical portion, and at one end has a portion 15 bearing against a corresponding bearing surface on the head portion 62 (or 61), and at the other end an internal screw thread 16 adapted to engage on a screw thread 17 on the head portion 61 (or 62).

The connecting parts 51 and 52 are in addition provided with rings 18 and 19 which are necessary to provide a seal on the one hand between the portions 51, 52 and the portions 61, 62, and on the other hand between the portions 51 and the container holding the respiratory gas under pressure, and between the portion 52 and the pipe 3 provided with a mouthpiece.

When the parts 1 and 2 are uncoupled (FIG. 1), the springs 81, 82 press the heads of the pistons 71, 72 against the front portions 91, 92, thus preventing the compressed gas from passing out of the part 1, and also preventing the entry into the part 2 of water which constitutes the ambient fluid.

The force of the springs, more particularly of spring 82, must be adjusted to withstand the pressure of the ambient fluid and to correspond during submarine work to the water pressure due to the immersion depth. In the case of the part 1, the pressure of the spring 81 applied to the piston 71 is supported by the pressure of the compressed respiratory gas, which in turn must be higher than the water pressure.

During the coupling of the parts 1 and 2 by means of the sleeve 4, empty spaces 20 (FIG. 2) are formed between the front portions 91 and 92. These spaces are filled with the ambient fluid, which in the case of submarine work is water and material suspended in water. After the first turns of the internal screw thread 16 have been engaged on the screw thread 17, the heads of the pistons have been moved towards one another so that the pin 13, fixed longitudinally on the head of the piston 71, bears against the head of the piston 72.

Figure 2:
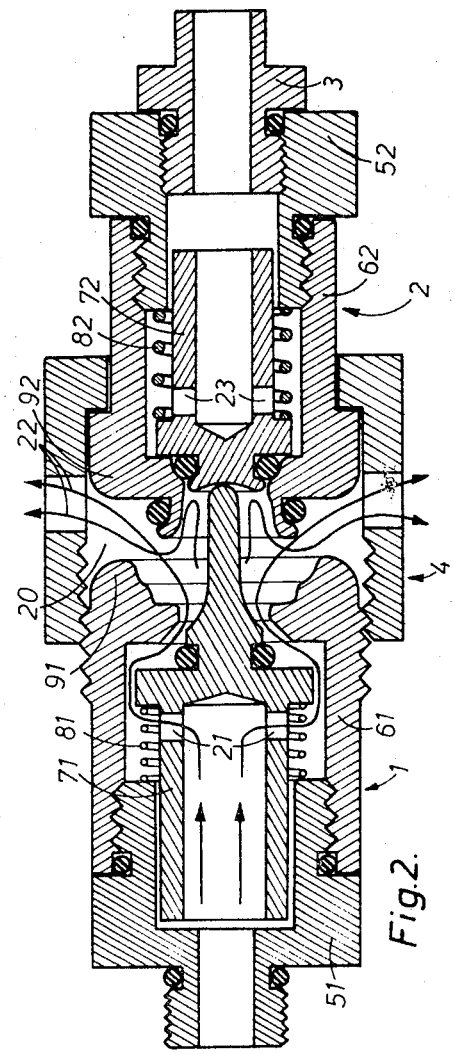
FIG. 2 shows them during the coupling of these parts.

When the sleeve is screwed further onto the part 1, the pin 13 causes the piston 71 to move back, the spring 81 offering less resistance to compression than the spring 82. Consequently, a passage through ports 21 in the piston 71 is opened for the compressed gas, and the latter spreads into the empty spaces 20 and drives out the ambient fluid through the ports 40 in the sleeve 4, as shown by arrows 22 (FIG. 2).

Figure 3:
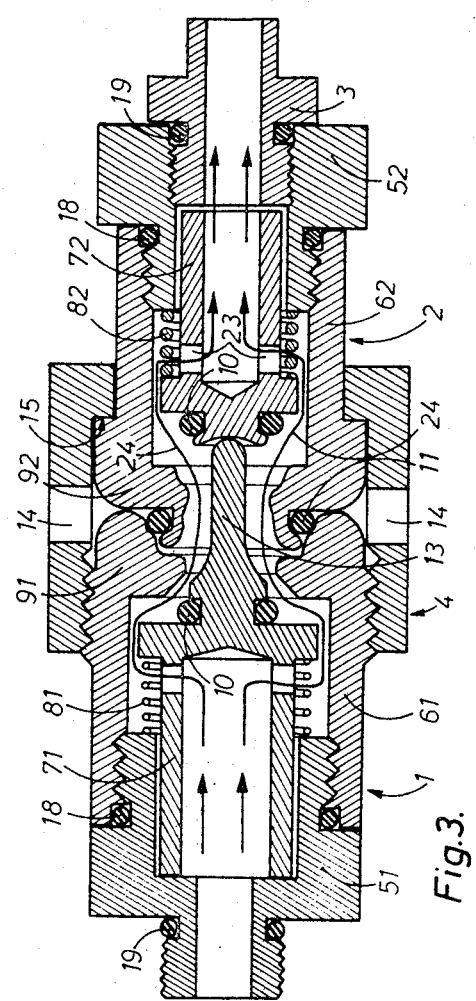
FIG. 3 shows them after they have been coupled.

After the piston 71 has borne against the bottom portion 51, the pin 13 can act on the piston 72 to force it in turn to move back and to allow the gas to pass towards the mouthpiece through ports 23, as shown by arrows 24 (FIG. 3).

In submarine diving the junction according to the invention provides the advantage that the diver can remain under water while replacing an exhausted compressed gas cylinder by a charged cylinder. The effective working time is increased because he can avoid at least one decompression period.

For submarine work in a fixed position and at a slight depth, such as in pearl culture parks, it is possible to supply compressed air to the working stations by means of a permanently fixed pipe provided with one or more connecting parts 1, enabling the diver to connect himself to the air either by means of a flexible pipe provided with a mouthpiece or, independently, with the aid of cylinders which he recharges as required.

Similar advantages are gained when working in dusty or injurious ambient gas media.

The invention is not limited to the embodiment which has been described and illustrated by way of example, and it would be possible to make modifications thereto without departing from its scope.

I claim:
1. A process for joining together connecting parts of at least two containers which contain fluids at identical or different pressures, in an ambient fluid with a pressure that is lower than that of at least one of the containers, while preventing the ambient fluid to be introduced into one of said containers, comprising the steps of first liberating the fluid of the container with a pressure higher than that of the ambient fluid, while effecting coupling of said connecting parts, and subsequently driving out the ambient fluid from the empty spaces between said connecting parts.

* * * * *